United States Patent
Wei

(10) Patent No.: US 12,105,656 B2
(45) Date of Patent: Oct. 1, 2024

(54) FLEXIBLY CONFIGURED MULTI-COMPUTING-NODE SERVER MAINBOARD STRUCTURE AND PROGRAM

(71) Applicant: INSPUR SUZHOU INTELLIGENT TECHNOLOGY CO., LTD., Jiangsu (CN)

(72) Inventor: Dong Wei, Jiangsu (CN)

(73) Assignee: INSPUR SUZHOU INTELLIGENT TECHNOLOGY CO., LTD., Jiangsu (CH)

( * ) Notice: Subject to any disclaimer, the term of this patent is extended or adjusted under 35 U.S.C. 154(b) by 68 days.

(21) Appl. No.: 18/020,768

(22) PCT Filed: Jul. 30, 2021

(86) PCT No.: PCT/CN2021/109444
§ 371 (c)(1),
(2) Date: Feb. 10, 2023

(87) PCT Pub. No.: WO2022/057464
PCT Pub. Date: Mar. 4, 2022

(65) Prior Publication Data
US 2023/0305980 A1  Sep. 28, 2023

(30) Foreign Application Priority Data

Sep. 18, 2020  (CN) .......................... 202010991856.5

(51) Int. Cl.
*G06F 13/40* (2006.01)
*G06F 13/42* (2006.01)

(52) U.S. Cl.
CPC ...... *G06F 13/4022* (2013.01); *G06F 13/4291* (2013.01); *G06F 2213/0016* (2013.01); *G06F 2213/0026* (2013.01)

(58) Field of Classification Search
None
See application file for complete search history.

(56) References Cited

U.S. PATENT DOCUMENTS 9,432,298 B1 * 8/2016 Smith ................. H04L 49/9057
9,652,427 B2 * 5/2017 Ryu .................... G06F 13/4022
(Continued)

FOREIGN PATENT DOCUMENTS

CN  105786421 A  7/2016
CN  107038139 A  8/2017
(Continued)

OTHER PUBLICATIONS

PCT/CN2021/109444 international search report.

*Primary Examiner* — Henry Tsai
*Assistant Examiner* — Christopher A Bartels
(74) *Attorney, Agent, or Firm* — IPro, PLLC

(57) ABSTRACT

A flexibly configured multi-computing-node server mainboard structure and a method. A processing unit connects to PCIE devices via I2C concurrently. The processing unit analyzes whether the acquired data of the PCIE devices are abnormal. The processing unit connects to a baseboard management controller via I2C, when the data are normal, the processing unit polls to transmit analyzed data to the baseboard management controller via I2C. When the data are abnormal, the processing unit pauses polling and transmitting information, and preferentially transmits abnormality information to the baseboard management controller. The processing unit is provided with an internal clock assembly and an external clock assembly, the external clock assembly is connected to a PCH, the internal clock assembly and the external clock module are connected to a data selector, and an output of the data selector is electrically connected to the PCIE devices.

18 Claims, 3 Drawing Sheets

(56) References Cited

U.S. PATENT DOCUMENTS

| | | | |
|---|---|---|---|
| 11,496,454 B2* | 11/2022 | Tran | G06F 21/41 |
| 12,045,081 B2* | 7/2024 | Ma | G06F 1/14 |
| 2014/0195712 A1* | 7/2014 | Ryu | G06F 13/4022 |
| | | | 710/313 |
| 2017/0132166 A1 | 5/2017 | Jiang | |
| 2018/0129503 A1* | 5/2018 | Narayan | H03K 19/0175 |
| 2019/0243658 A1* | 8/2019 | Liu | G06F 11/07 |
| 2020/0403940 A1* | 12/2020 | Daly | H04L 49/70 |
| 2021/0109885 A1* | 4/2021 | Guo | G06F 1/04 |
| 2023/0089528 A1* | 3/2023 | Oliver | G06F 9/546 |
| | | | 713/100 |
| 2023/0315144 A1* | 10/2023 | Ma | G06F 1/14 |
| | | | 713/400 |

FOREIGN PATENT DOCUMENTS

| | | |
|---|---|---|
| CN | 107302465 A | 10/2017 |
| CN | 109117407 A | 1/2019 |
| CN | 109739794 A | 5/2019 |
| CN | 111078445 A | 4/2020 |
| CN | 111966189 A | 11/2020 |

* cited by examiner

FLEXIBLY CONFIGURED MULTI-COMPUTING-NODE SERVER MAINBOARD STRUCTURE AND PROGRAM

The present application claims the priority of the Chinese patent application filed on Sep. 18, 2020 before the Chinese Patent Office with the application number of 202010991856.5 and the title of "FLEXIBLY CONFIGURED MULTI-COMPUTING-NODE SERVER MAINBOARD STRUCTURE AND PROGRAM", which is incorporated herein in its entirety by reference.

FIELD

The present application relates to the field of object searching, and particularly relates to a flexibly configured multi-computation-node server mainboard structure and a program.

BACKGROUND

A baseboard management controller (BMC) and a complex programmable logic device (CPLD) are used to manage a complete device in terms of heat dissipation, electric-power supplying and so on. BMC usually uses inter-integrated circuit (I2C) buses to be connected to peripheral component interconnect express (PCIE) devices to acquire the information of the complete device, including the acquirement of the information such as the temperature, the device availability and the device serial number.

Because BMC has a limited I2C resource, it is frequently required to use I2C SWITCH to expand the I2C. BMC has a limited I2C resource, when an excessively high quantity of PCIE devices are installed in a server, address conflict very easily happens. Furthermore, when the devices are too many, the I2C polling duration of BMC is excessively long, and the information of the devices may not be monitored in real time. Usually, abnormality information may not be detected immediately, and heat-dissipation regulation and abnormality alarming may not be performed immediately.

The clock signal of the conventional PCIE devices is provided by a platform controller hub (PCH, an integrated south bridge of the Intel Corporation). When the clock resource of the PCH is insufficient, the CLOCK BUFFER of a central processing unit (CPU) is utilized to provide clock to the devices such as an accelerator card and an NVME. Therefore, all of the PCIE clock signals come from the PCH of the mainboard or the CLOCK BUFFER of the mainboard (the clock source of the CLOCK BUFFER is the PCH). However, the PCH of the mainboard may operate normally only when the mainboard CPU is available. Some PCIE devices whose communication process does not require the participation of the CPU, when operating, are also required to electrify the CPU and the PCH, and may not operate independently. Furthermore, when the on-board system of the mainboard is used to merely provide the clock signal, the resource utilization ratios of the CPU and the PCH are very low, which causes cost waste. When the CPU or the PCH of the mainboard is abnormal, even the PCIE devices whose communication process does not require the participation of the CPU may not operate normally.

SUMMARY

The present disclosure provides a flexibly configured multi-computation-node server mainboard structure and a program, which aims at solving the problem of address conflict when an excessively high quantity of devices are installed in a server, the problem that the I2C polling duration of BMC is excessively long and the information of the devices may not be monitored in real time, the problem that the PCH and the CPU of the mainboard must be available to provide the clock signal to the devices, which causes that the devices may not operate independently, and the problem that the operation of the PCH and the CPU merely provides the clock signal, which results in resource waste.

In order to achieve the above objects, the present disclosure provides a flexibly configured multi-computation-node server mainboard structure, including a processing unit, the processing unit are connected to a plurality of PCIE devices by a plurality of I2C buses, and the processing unit acquires data of the PCIE devices concurrently;
  the processing unit analyzes whether acquired data are abnormal;
  the processing unit connects to a baseboard management controller via I2C, in response to the data being normal, the processing unit polls to transmit analyzed data to the baseboard management controller via I2C;
  in response to the data being abnormal, the processing unit pauses polling and transmitting information, and preferentially transmits abnormality information to the baseboard management controller;
  the PCIE devices are connected to a PCIEswitch via a PCIE bus, and the PCIEswitch are connected to a CPU via the PCIE bus; and
  the CPU is electrically connected to a PCH, and the CPU is electrically connected to a storage unit.

In some embodiments of the present application, the processing unit is provided with an internal clock module and an external clock module, the external clock module is connected to a clock output of the PCH, the internal clock module and the external clock module are connected to a data selecting module, and an output of the data selecting module is electrically connected to the PCIE devices.

In some embodiments of the present application, the processing unit is configured with an I2C communication protocol, a part of serial input/output (IO) ports of the processing unit are connected to the PCIE devices by the I2C buses, and at least one of the serial IO ports of the processing unit is connected to the baseboard management controller; and
  the serial IO ports are connected to an internal memory of the processing unit.

In some embodiments of the present application, the internal memory is provided with a first space for specially storing a parameter threshold, the parameter threshold is used to determine normal operation of the PCIE devices; and
  the internal memory is provided with a second space for specially storing the data.

In some embodiments of the present application, the processing unit is provided with a logical-operation module, the logical-operation module is connected to the internal memory, the logical-operation module acquires the data and the parameter threshold to perform logical comparison, and outputs a comparison result, and the processing unit determines whether the data are abnormal according to the comparison result.

In some embodiments of the present application, the data are normal, the processing unit executes a first instruction, circulates to sequentially acquire data from different memory addresses of the second space, and sends the data polling to the baseboard management controller.

In some embodiments of the present application, the data are abnormal, the processing unit stops executing the first instruction by using a second instruction, the processing unit invokes the data from the second space storing the abnormal data and sends the data to the baseboard management controller by using the second instruction, the baseboard management controller returns a response signal, the processing unit continues to execute the first instruction, and the processing unit circulates to sequentially acquire data from different memory addresses of the second space, and sends the data polling to the baseboard management controller.

In some embodiments of the present application, the data selecting module includes a disjunction gate, an output terminal of the disjunction gate is connected to the PCIE devices to provide a clock signal, two input terminals of the disjunction gate are connected to an output terminal of a first conjunction gate and an output terminal of a second conjunction gate, respectively, one input terminal of the first conjunction gate is connected to an output of an inverter, an input of the inverter and one input terminal of the second conjunction gate are connected to a controlling input terminal, and the other input terminal of the first conjunction gate and the other input terminal of the second conjunction gate are connected to an output of the external clock module and an output of the internal clock module, respectively.

In some embodiments of the present application, the processing unit is provided with a watchdog module, the watchdog module detects a clock output of the PCH, and when the clock output is abnormal or has no signal, the watchdog module outputs a controlling signal to control the data selecting module to output a signal of the internal clock module.

The present disclosure further provides a program of a flexibly configured multi-computation-node server, applied to the flexibly configured multi-computation-node server mainboard structure, the program includes a first instruction and a second instruction, the first instruction polls to send data stored in an internal memory to the baseboard management controller, the second instruction acquires and analyzes an output of a logical-operation module, in response to the data being abnormal, the second instruction pauses execution of the first instruction, the second instruction sends abnormal data to the baseboard management controller, the second instruction acquires a response signal returned by the baseboard management controller, and the second instruction controls the first instruction to be continuously executed.

The flexibly configured multi-computation-node server mainboard structure and the program according to the present application have the following advantageous effects:

(1) The processing unit receives the data of the PCIE devices concurrently, and analyzes the data of the PCIE devices concurrently, which prevents the problem of address conflict when the baseboard management controller and the I2C switch are used to receive the data of the PCIE devices, and the concurrent analysis has a fast analyzing speed.

(2) When data abnormality is analyzed out, the abnormality information is directly and preferentially transmitted to the baseboard management controller, as compared with the mode that the baseboard management controller polls to acquire the data, which may transmit the abnormal data in time, to result in a quick abnormality response.

(3) The data are analyzed by the processing unit, which reduces the resource consumption of the baseboard management controller, and saves the I2C interface resource of the baseboard management controller.

(4) The processing unit independently provides the clock to the PCIE devices, whereby, when the CPU and the PCH are not electrified, the PCIE devices that do not require the participation of the CPU acquires the clock signal and operates normally, to reduce the energy consumption.

BRIEF DESCRIPTION OF THE DRAWINGS

In order to more clearly illustrate the technical solutions of the embodiments of the present disclosure or the prior art, the figures that are required to describe the embodiments or the prior art will be briefly described below. Apparently, the figures that are described below are merely embodiments of the present disclosure, and a person skilled in the art may obtain other figures according to the structures shown in these figures without paying creative work.

Figure 1:
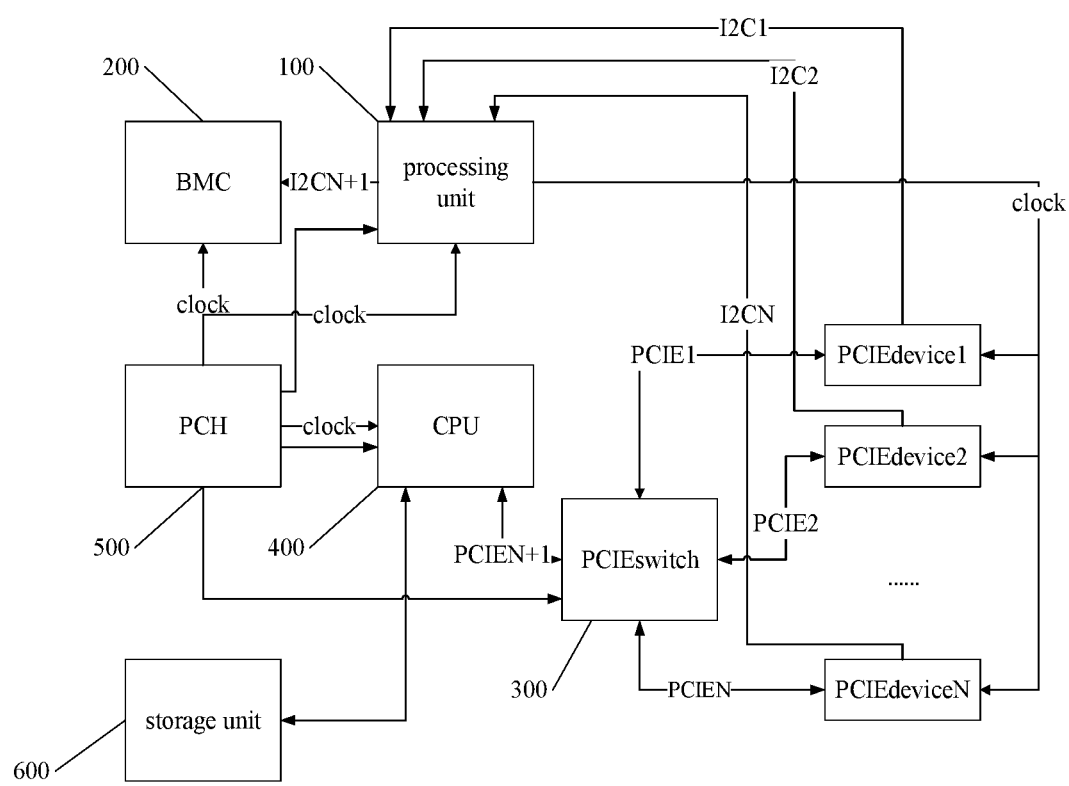
FIG. 1 is a schematic diagram of a flexibly configured multi-computation-node server mainboard structure according to an embodiment of the present disclosure.

The reference numbers in the drawings and their meanings are as follows:

100: processing unit, 101: serial-port communication modules, 102: internal clock module, 103: external clock module, 104: data selecting module, 105: internal memory, 106: logical-operation module, 107: watchdog module, 200: baseboard management controller, 300: PCIEswitch, 400: CPU, 500: PCH, and 600: storage unit.

In the drawings BMC represents the baseboard management controller, and in the drawings PCIEdevicex represents the PCIE devices.

The purpose realizing, the functional characteristics and the advantages of the present disclosure will be further described with reference to the embodiments and the drawings.

DETAILED DESCRIPTION

It should be understood that the particular embodiments described herein are merely intended to interpret the present disclosure, and are not intended to limit the present disclosure.

In some embodiments, referring to FIG. 1, the present disclosure provides a flexibly configured multi-computation-node server mainboard structure. The structure includes a mainboard, the mainboard is provided with a processing unit 100, the processing unit 100 is provided with a plurality of serial-port communication modules 101, and each of the serial-port communication modules 101 is connected to one PCIE device via an I2C bus. In an implementation, the processing unit 100 may be a field programmable gate array (FPGA) chip, the FPGA chip is configured with an I2C communication protocol, a part of the serial IO ports of the FPGA chip are connected to the PCIE devices by the I2C buses, and one of the serial IO ports of the FPGA chip are connected to a baseboard management controller 200. The serial IO ports are connected to an internal memory 105 of the FPGA chip.

The serial-port communication modules 101 acquire the data of the PCIE devices concurrently. In some embodiments, the PCIE devices send the data to the serial IO ports of the FPGA chip, and the FPGA receives the data and stores the data in a second space of the internal memory 105. The internal memory 105 is further provided with a first space, and the first space is burned with a parameter threshold, the parameter threshold is used to determine normal operation of the PCIE devices. The different memory addresses of the second space are mapped to the different PCIE devices one to one. The different memory addresses of the first space are mapped to the memory addresses of the second space one to one.

The processing unit 100 analyzes whether the data acquired by the serial-port communication modules 101 are abnormal. The processing unit 100 is provided with a logical-operation module 106, the logical-operation module 106 is connected to the internal memory 105, the logical-operation module 106 simultaneously reads the data of the second space, the logical-operation module 106 simultaneously reads the parameter threshold of the first space, the logical-operation module 106 performs logical comparison of all of the data and the correspondingly parameter threshold concurrently, and outputs a comparison result, and the processing unit 100, according to the comparison result, determines whether the data are abnormal. In some embodiments, a feasible mode is that, in response to the data being within the range of the parameter threshold, then the logical-operation module outputs a first signal, and in response to the data exceeding the range of the parameter threshold, then the logical-operation module outputs a second signal.

Figure 4:
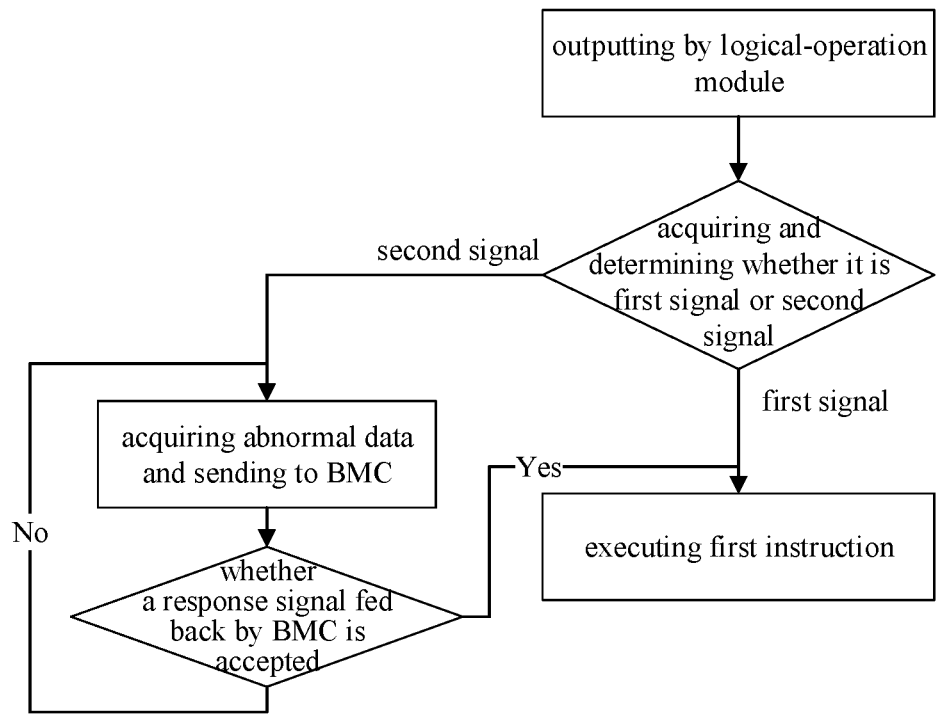
FIG. 4 is a schematic flow chart of a second instruction according to an embodiment of the present disclosure.

The processing unit 100 connects to the baseboard management controller 200 via I2C. In some embodiments, referring to FIG. 4, the second instruction is provided with a conditional structure for determining whether the received signal is the first signal or the second signal, the second instruction is provided with a monitoring inputting port, and the monitoring inputting port is connected to the output of the logical-operation module, and, by using the conditional structure of the second instruction, selects whether to continue executing the first instruction or to pause the first instruction and execute the transmission of the abnormal data. In response to the data being normal, the processing unit 100 polls to transmit the analyzed data to the baseboard management controller 200 via I2C. In some embodiments, the data are normal, the processing unit 100 continues to execute the first instruction, circulates to sequentially acquire the data from different memory addresses of the second space, and sends the data polling to the baseboard management controller 200. In some embodiments, the first instruction defines the memory addresses of the second space, and, by using the circulation structure, polls to acquire the data from the memory addresses of the second space and transmit the data to the baseboard management controller.

In response to the data being abnormal, the processing unit 100 pauses polling and transmitting information, and preferentially transmits abnormality information to the baseboard management controller 200. In some embodiments, the data are abnormal, the processing unit 100, by using a second instruction, stops executing the first instruction, the processing unit 100 executes the second instruction, performs abnormal-data transmission, and, in some embodiments, invokes the data from the second space storing the abnormal data and sends the data to the baseboard management controller 200, the baseboard management controller 200 returns a response signal, the processing unit 100 continues to execute the first instruction, and the processing unit circulates to sequentially acquire the data from different memory addresses of the second space, and sends the data polling to the baseboard management controller 200.

Figure 2:
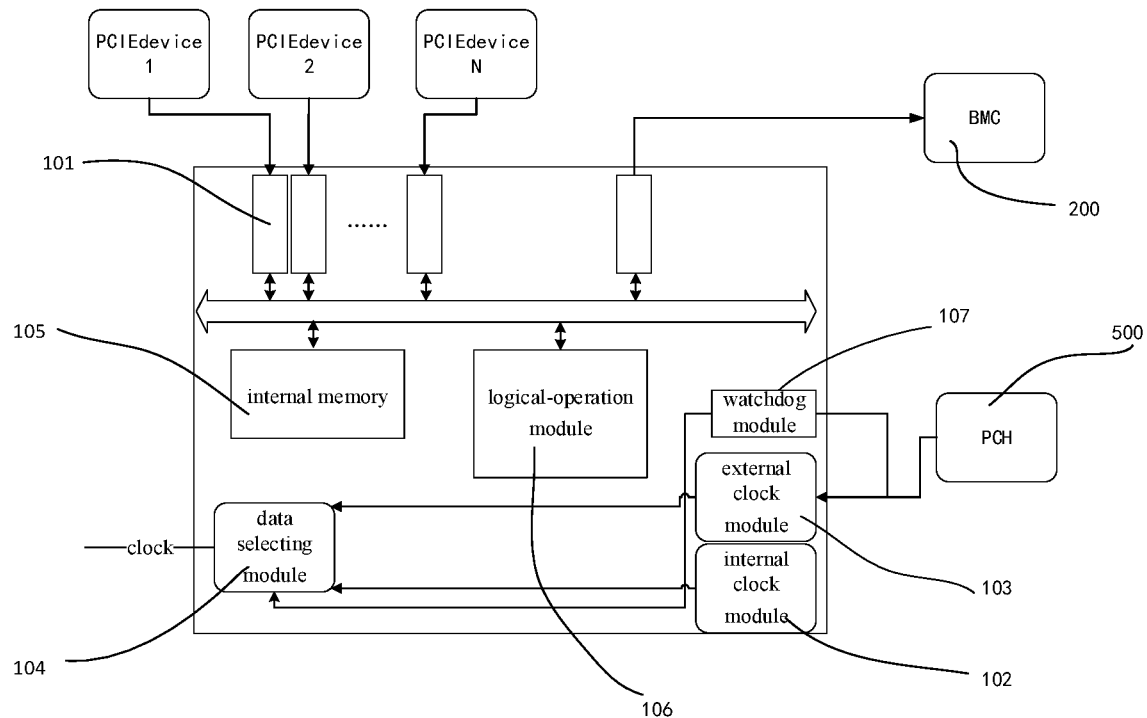
FIG. 2 is a schematic diagram of the architecture of a processing unit according to an embodiment of the present disclosure.
Figure 3:
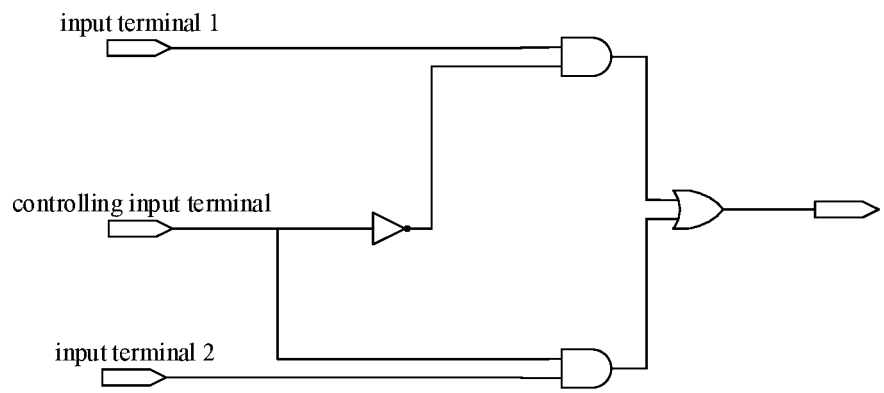
FIG. 3 is a schematic diagram of a data selecting unit according to an embodiment of the present disclosure.

Referring to FIG. 2, the processing unit 100 is provided with an internal clock module 102 and an external clock module 103. The clock source of the external clock module 103 is a clock output connected to a PCH 500, and the external clock module outputs a frequency multiplication of the clock output of the PCH. The internal clock module 102 is a phase-locked loop configured inside the processing unit 100, the phase-locked loop generates a 100 MHz clock signal, the internal clock module 102 and the external clock module 103 are connected to a data selecting module 104. The output of the data selecting module 104 is electrically connected to the PCIE devices. In some embodiments, referring to FIG. 3, the data selecting module 104 includes a disjunction gate, the output terminal of the disjunction gate is connected to the PCIE devices to provide a clock signal, two input terminals of the disjunction gate are connected to the output terminal of a first conjunction gate and the output terminal of a second conjunction gate, respectively, one input terminal of the first conjunction gate is connected to the output of an inverter, the input of the inverter and one input terminal of the second conjunction gate are connected to a controlling input terminal, the other input terminal (an input terminal 1) of the first conjunction gate is connected to the output of the external clock module, and the other input terminal (an input terminal 2) of the second conjunction gate is connected to the output of the internal clock module. When the controlling input terminal inputs a high level, the data selecting module 104 outputs the output of the internal clock module connected to the input terminal 2. When the controlling input terminal inputs a low level, the data selecting module 104 outputs the output of the external clock module connected to the input terminal 1.

The processing unit 100 is provided with a watchdog module 107, the input of the watchdog module 107 is linked to the clock signal outputted to the processing unit 100 by the PCH, and the output of the watchdog module 107 is connected to the controlling input terminal. In response to the clock signal being abnormal or the clock disappearing, then the watchdog module 107 outputs a high level, so that the internal clock module provides the clock output.

The PCIE devices are connected to a PCIEswitch 300 via a PCIE bus, and the PCIEswitch 300 is connected to a CPU 400 via the PCIE bus. The PCIEswitch configures the PCIE device specified by any one user as a slave device and configures the CPU 400 as a primary device, so that the CPU and the PCIE device establish a PCIE communication.

The PCIE configures a PCIE device specified by any one user as a slave device and configures another PCIE device specified by the user as a primary device, so that one PCIE device and the other PCIE device establish a PCIE communication.

The one PCIE device and the other PCIE device establish the PCIE communication without the participation of the CPU and the PCH. The PCH 500 and the CPU 400 are powered off, and the watchdog module 107 monitors the absence of the PCH 500, outputs the clock signal, and outputs a high level to control the data selecting module 104 to selectively output the signal of the internal clock module.

The CPU 400 is electrically connected to a PCH 500, and the CPU 400 is electrically connected to a storage unit 600.

Figure 5:
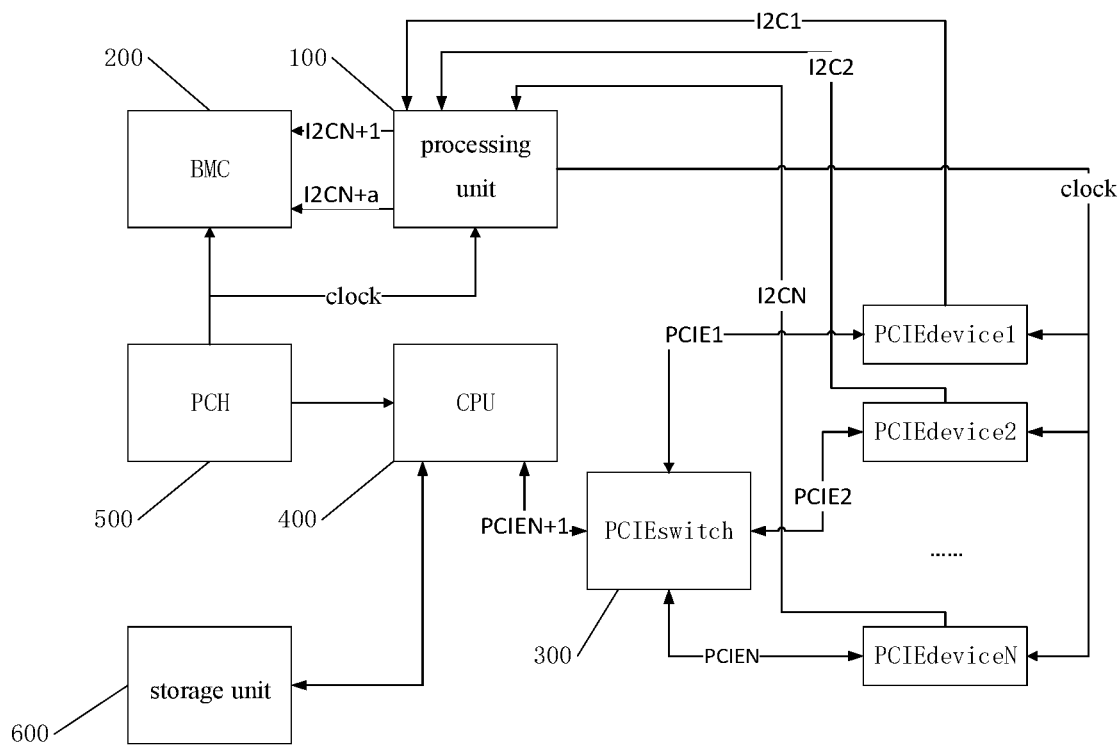
FIG. 5 is a schematic diagram of another flexibly configured multi-computation-node server mainboard structure according to an embodiment of the present disclosure.

In some embodiments, referring to FIG. 5, the embodiment differs from the embodiment described above mainly in that the processing unit 100 is connected to the baseboard management controller 200 by a (a∈positive integer, 1<a<N) channels of I2C, and each of the channels of the I2C transmits a part of the data of the second space. The data stored in the second space are transmitted via the plurality of channels of I2C, which prevents the problem in the embodiment described above that, when the transmission is via one channel of I2C, in response to the one channel of I2C being damaged, the information of the entire PCIE device may not be transmitted.

The present disclosure further provides a program of a flexibly configured multi-computation-node server, applied to the flexibly configured multi-computation-node server mainboard structure, the program includes a first instruction and a second instruction, the first instruction polls to send data stored in an internal memory to a baseboard management controller, the second instruction acquires and analyzes the output of the logical-operation module, in response to the data being abnormal, the second instruction pauses execution of the first instruction, the second instruction sends the abnormal data to the baseboard management controller, the second instruction acquires a response signal returned by the baseboard management controller, and the second instruction controls the first instruction to be continuously executed.

The present disclosure further provides a storage medium of a flexibly configured multi-computation-node server, which may be externally connected to the processing unit, and the storage medium stores the program of a flexibly configured multi-computation-node server.

It should be noted that, in the claims, any reference signs between parentheses should not be construed as limiting the claims. The word "include" does not exclude elements or steps that are not listed in the claims. The word "a" or "an" preceding an element does not exclude the existing of a plurality of such elements. The present disclosure may be implemented by means of hardware including several different elements and by means of a properly programmed computer. In unit claims that list several devices, some of those devices may be embodied by the same item of hardware. The words first, second, third and so on do not denote any order. Those words may be interpreted as names.

Although preferable embodiments of the present disclosure have been described, once a person skilled in the art has known the essential inventive concept, he may make further variations and modifications on those embodiments. Therefore, the appended claims are intended to be interpreted as including the preferable embodiments and all of the variations and modifications that fall within the scope of the present disclosure.

Apparently, a person skilled in the art may make various modifications and variations on the present disclosure without departing from the spirit and the scope of the present disclosure. Accordingly, when those modifications and variations on the present disclosure fall within the scope of the claims of the present disclosure and equivalents thereof, then the present disclosure is also intended to encompass those modifications and variations.

The invention claimed is:

1. A flexibly configured multi-computation-node server mainboard structure, comprising a processing unit, wherein the processing unit are connected to a plurality of peripheral component interconnect express (PCIE) devices by a plurality of inter-integrated circuit (I2C) buses, and the processing unit acquires data of the PCIE devices concurrently;
   the processing unit analyzes whether acquired data are abnormal;
   the processing unit connects to a baseboard management controller via I2C, in response to the data being normal, the processing unit polls to transmit analyzed data to the baseboard management controller via I2C;
   in response to the data being abnormal, the processing unit pauses polling and transmitting information, and preferentially transmits abnormality information to the baseboard management controller;
   the PCIE devices are connected to a PCIEswitch, and the PCIEswitch are connected to a central processing unit (CPU);
   the CPU is electrically connected to a platform controller hub (PCH), and the CPU is electrically connected to a storage unit;
   the processing unit is provided with an internal clock assembly and an external clock assembly, the external clock assembly is connected to a clock output of the PCH, the internal clock assembly and the external clock assembly are connected to a data selector, and an output of the data selector is electrically connected to the PCIE devices; and
   the data selector comprises a disjunction gate, an output terminal of the disjunction gate is connected to the PCIE devices to provide a clock signal, two input terminals of the disjunction gate are connected to an output terminal of a first conjunction gate and an output terminal of a second conjunction gate, respectively, one input terminal of the first conjunction gate is connected to an output of an inverter, an input of the inverter and one input terminal of the second conjunction gate are connected to a controlling input terminal, and the other input terminal of the first conjunction gate and the other input terminal of the second conjunction gate are connected to an output of the external clock assembly and an output of the internal clock assembly, respectively.

2. The flexibly configured multi-computation-node server mainboard structure according to claim 1, wherein the processing unit is configured with an I2C communication protocol, a part of serial input/output (IO) ports of the processing unit are connected to the PCIE devices by the I2C buses, and at least one of the serial IO ports of the processing unit is connected to the baseboard management controller; and
   the serial IO ports are connected to an internal memory of the processing unit.

3. The flexibly configured multi-computation-node server mainboard structure according to claim 2, wherein the internal memory is provided with a first space for specially storing a parameter threshold, wherein the parameter threshold is used to determine normal operation of the PCIE devices; and
   the internal memory is provided with a second space for specially storing the data.

4. The flexibly configured multi-computation-node server mainboard structure according to claim 3, wherein the processing unit is provided with a logical-operation unit, the logical-operation unit is connected to the internal memory, the logical-operation unit acquires the data and the parameter threshold to perform logical comparison, and outputs a comparison result, and the processing unit determines whether the data are abnormal according to the comparison result.

5. The flexibly configured multi-computation-node server mainboard structure according to claim 4, wherein the data are normal, the processing unit executes a first instruction, circulates to sequentially acquire data from different memory addresses of the second space, and sends the data polling to the baseboard management controller.

6. The flexibly configured multi-computation-node server mainboard structure according to claim 5, wherein the data are abnormal, the processing unit stops executing the first instruction by using a second instruction, the processing unit invokes the data from the second space storing abnormal data and sends the data to the baseboard management controller by using the second instruction, the baseboard management controller returns a response signal, the processing unit continues to execute the first instruction, and the processing unit circulates to sequentially acquire data from different memory addresses of the second space, and sends the data polling to the baseboard management controller.

7. The flexibly configured multi-computation-node server mainboard structure according to claim 6, wherein the second instruction is provided with a conditional structure for determining whether a received signal is a first signal or a second signal;
 the second instruction is provided with a monitoring inputting port, the monitoring inputting port is connected to an output of the logical-operation unit; and
 by using the conditional structure of the second instruction, the processing unit selects whether to continue executing the first instruction or to pause the first instruction and execute transmission of the abnormal data.

8. The flexibly configured multi-computation-node server mainboard structure according to claim 5, wherein the first instruction defines the memory addresses of the second space, and, by using a circulation structure, the processing unit polls to acquire the data from the memory addresses of the second space and transmit the data to the baseboard management controller.

9. The flexibly configured multi-computation-node server mainboard structure according to claim 4, wherein in response to the data being within a range of the parameter threshold, the logical-operation unit outputs a first signal; and
 in response to the data exceeding the range of the parameter threshold, the logical-operation unit outputs a second signal.

10. The flexibly configured multi-computation-node server mainboard structure according to claim 3, wherein different memory addresses of the second space are mapped to the different PCIE devices one to one, and different memory addresses of the first space are mapped to the memory addresses of the second space one to one.

11. The flexibly configured multi-computation-node server mainboard structure according to claim 1, wherein the processing unit is provided with a watchdog, the watchdog detects a clock output of the PCH, and when the clock output is abnormal or has no signal, the watchdog outputs a controlling signal to control the data selector to output a signal of the internal clock assembly.

12. The flexibly configured multi-computation-node server mainboard structure according to claim 1, wherein the processing unit is provided with a plurality of serial-port communication assembly, and each of the serial-port communication assembly is connected to one PCIE device via the I2C bus.

13. The flexibly configured multi-computation-node server mainboard structure according to claim 1, wherein the processing unit is a field programmable gate array (FPGA) chip.

14. The flexibly configured multi-computation-node server mainboard structure according to claim 1, wherein the external clock assembly outputs a frequency multiplication of the clock output of the PCH.

15. The flexibly configured multi-computation-node server mainboard structure according to claim 1, wherein the internal clock assembly is a phase-locked loop configured inside the processing unit, and the phase-locked loop generates a 100 MHz clock signal.

16. The flexibly configured multi-computation-node server mainboard structure according to claim 1, wherein an input terminal 1 of the first conjunction gate is connected to the output of the external clock module, and an input terminal 2 of the second conjunction gate is connected to the output of the internal clock module; and
 when the controlling input terminal inputs a high level, the data selector 104 outputs the output of the internal clock module connected to the input terminal 2; and
 when the controlling input terminal inputs a low level, the data selector 104 outputs the output of the external clock module connected to the input terminal 1.

17. A method of a flexibly configured multi-computation-node server, applied to a flexibly configured multi-computation-node server mainboard structure, wherein the flexibly configured multi-computation-node server mainboard structure comprises a processing unit, wherein the processing unit are connected to a plurality of peripheral component interconnect express (PCIE) devices by a plurality of inter-integrated circuit (I2C) buses, and the processing unit acquires data of the PCIE devices concurrently;
 the processing unit analyzes whether acquired data are abnormal; the processing unit connects to a baseboard management controller via I2C, in response to the data being normal, the processing unit polls to transmit analyzed data to the baseboard management controller via I2C; in response to the data being abnormal, the processing unit pauses polling and transmitting information, and preferentially transmits abnormality information to the baseboard management controller;
 the PCIE devices are connected to a PCIEswitch, and the PCIEswitch are connected to a central processing unit (CPU);
 the CPU is electrically connected to a platform controller hub (PCH), and the CPU is electrically connected to a storage unit; and
 the method comprises a first instruction and a second instruction, the first instruction polls to send data stored in an internal memory to the baseboard management controller, the second instruction acquires and analyzes an output of a logical-operation unit, in response to the data being abnormal, the second instruction pauses execution of the first instruction, the second instruction sends abnormal data to the baseboard management controller, the second instruction acquires a response signal returned by the baseboard management controller, and the second instruction controls the first instruction to be continuously executed;
 wherein the processing unit is provided with an internal clock assembly and an external clock assembly, the external clock assembly is connected to a clock output of the PCH, the internal clock assembly and the external clock assembly are connected to a data selector, and an output of the data selector is electrically connected to the PCIE devices; and the data selector comprises a disjunction gate, an output terminal of the disjunction gate is connected to the PCIE devices to provide a clock signal, two input terminals of the disjunction gate are connected to an output terminal of a first conjunction gate and an output terminal of a second conjunction gate, respectively, one input terminal of the first conjunction gate is connected to an output of an inverter, an input of the inverter and one input terminal of the second conjunction gate are connected to a controlling input terminal, and the other input terminal of the first conjunction gate and the other input terminal of the second conjunction gate are connected to an output of the external clock assembly and an output of the internal clock assembly, respectively.

18. A flexibly configured multi-computation-node server, comprising a flexibly configured multi-computation-node server mainboard structure, wherein the flexibly configured multi-computation-node server mainboard structure comprises a processing unit, wherein the processing unit are connected to a plurality of peripheral component interconnect express (PCIE) devices by a plurality of inter-integrated circuit (I2C) buses, and the processing unit acquires data of the PCIE devices concurrently;

the processing unit analyzes whether acquired data are abnormal; the processing unit connects to a baseboard management controller via I2C, in response to the data being normal, the processing unit polls to transmit analyzed data to the baseboard management controller via I2C; in response to the data being abnormal, the processing unit pauses polling and transmitting information, and preferentially transmits abnormality information to the baseboard management controller;

the PCIE devices are connected to a PCIEswitch, and the PCIEswitch are connected to a central processing unit (CPU);

the CPU is electrically connected to a platform controller hub (PCH), and the CPU is electrically connected to a storage unit;

wherein the processing unit is provided with an internal clock assembly and an external clock assembly, the external clock assembly is connected to a clock output of the PCH, the internal clock assembly and the external clock assembly are connected to a data selector, and an output of the data selector is electrically connected to the PCIE devices; and the data selector comprises a disjunction gate, an output terminal of the disjunction gate is connected to the PCIE devices to provide a clock signal, two input terminals of the disjunction gate are connected to an output terminal of a first conjunction gate and an output terminal of a second conjunction gate, respectively, one input terminal of the first conjunction gate is connected to an output of an inverter, an input of the inverter and one input terminal of the second conjunction gate are connected to a controlling input terminal, and the other input terminal of the first conjunction gate and the other input terminal of the second conjunction gate are connected to an output of the external clock assembly and an output of the internal clock assembly, respectively.

* * * * *